Feb. 6, 1951 W. G. BROSENE, JR., ET AL 2,540,163
BLOOD PRESSURE MEASURING DEVICE
Filed Nov. 22, 1946 2 Sheets-Sheet 1
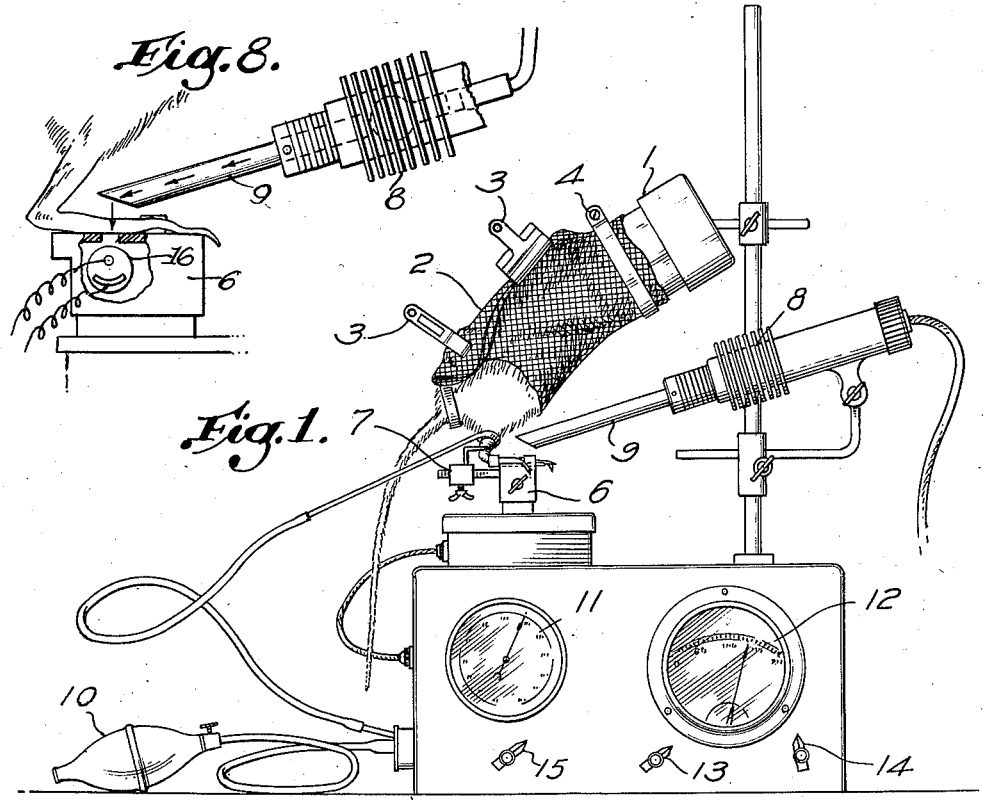
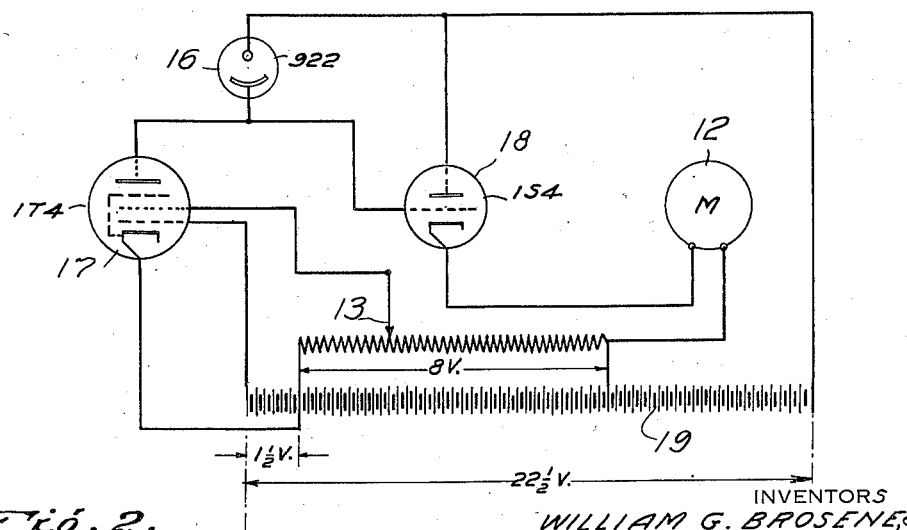
INVENTORS
WILLIAM G. BROSENE, JR.
HAROLD J. KERSTEN,
BY
Samuel Brandt Walker
ATTORNEY

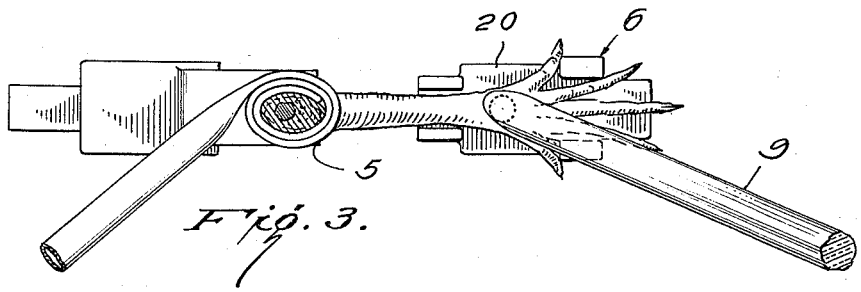
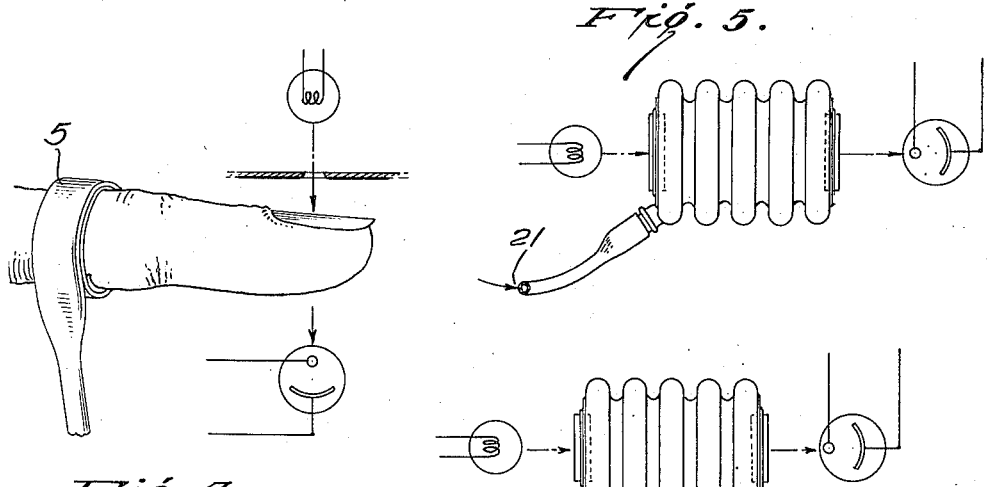
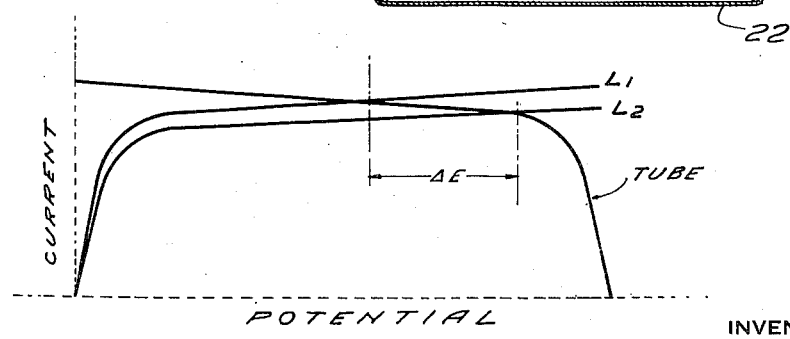

Patented Feb. 6, 1951

2,540,163

UNITED STATES PATENT OFFICE 2,540,163

BLOOD PRESSURE MEASURING DEVICE

William G. Brosene, Jr., and Harold J. Kersten, Cincinnati, Ohio, assignors to American Cyanamid Company, New York, N. Y., a corporation of Maine Application November 22, 1946, Serial No. 711,714

4 Claims. (Cl. 128—2.05)

This invention relates to a new photoelectric device for the measuring of variables; more particularly variables in a system in which the density of a colored or semi-opaque component and hence the transmission of light varies in accordance with a predictable pattern as a function of a variable which is to be measured; and which can be adapted to measure length, pressure, force, etc.

A specific object of our invention is to provide a convenient method for the determination of the blood pressure of various mammals, including such varied creatures as humans, and dogs, cats, rats, mice, guinea pigs, hamsters and other experimental laboratory animals.

Many people suffer from faulty blood pressure, and high blood pressure is one of the common causes of death. Its importance has become increasingly apparent as the average life span of individuals is increased. The number of people suffering from various forms of high blood pressure or other blood pressure diseases is distressingly large and to date no successful treatment has been found for a large proportion of the cases. A great deal of this lack of adequate treatment results from the fact that in the past there has been no satisfactory method of determining the blood pressure changes of laboratory animals, particularly rats, so that it would be possible to evaluate various drugs and treatments under controlled conditions. Dogs have been used but their utility is greatly limited by the fact that it requires such a large amount of space and food to adequately care for dogs. Larger samples of drugs, which may be difficult to obtain, are required, and it is difficult to obtain dogs with abnormal blood pressure in order that changes may be studied. A rat is a far more suitable animal for blood pressure studies because it is smaller and accordingly requires less space, less food, and less treatment, and because the rat is better known and understood. Further, it is possible by comparatively simple means to obtain rats which are hypertensive.

In the past there have been various methods used for measuring the blood pressure of rats and smaller animals, the most accurate of which has been a direct puncture method in which a hydraulic pressure gauge has been inserted directly into an artery of the animal. However, this is not satisfactory for the reasons that it is necessary to anesthetize a rat during the measurement of the blood pressure and the effect of the anesthetic and the shock of the puncture is such that the readings may not be the normal readings. Further, it is not possible to get a series of readings over an extended period on the same animal. The best known previous method of direct puncture involves the tying off of the artery after the measurement, and about four measurements is all that can be taken on one rat.

Another method of measuring the blood pressure on rats and small animals has involved the use of an inflatable cuff about the base of the animal's tail, and measuring the blood pressure changes in the tail by measuring the volume change in the tail by use of an oncometer tube. In rats it has been found necessary to warm the animal in order to produce a greater dilation in the tail, or else to anesthetize the rat, so that movements of the rat's tail would not be of greater magnitude than and obscure the blood pressure effect. However, the heating of the animal renders the animal no longer normal and in turn gives abnormal blood pressure readings. Past work has shown considerable variations and erratic results by the method. It was found that different rats responded differently to similar heating conditions and to similar treatment on different days. It is believed that the rat has a peculiar reflex vaso constriction of the arteries of the tail and that the animal can regulate the flow of blood to the tail at will, and use the tail somewhat as a radiator.

The blood pressure in the tail may thus be independent of the actual blood pressure of the rat. Prior methods of blood pressure measurement have not been satisfactory.

By our method it is possible to use a normal rat which has been neither anesthetized nor warmed, and measure the blood pressure on the rat's foot with the least possible nervous reaction of the rat, so that after a short period during which the rat has become accustomed to being handled, it is possible to obtain reproducible blood pressure readings on rats under controlled conditions, and it thus is possible for the first time to adequately determine the effect of various drugs and stimuli on the blood pressure of the rat without having to make compensating allowances of an unknown magnitude for the effect of unpredictable and uncontrollable variables. It accordingly is possible by the use of our invention to make studies of the effect of foods, drugs, and other stimuli upon the blood pressure of the rat over any desired length of time so that it accordingly becomes possible, for the first time, to get dependable, accurate, reproducible results, and accordingly to make a scientific and systematic survey which may lead to great advancements in the knowledge of the treatment of the circulatory system.

In the past, various devices have been used for the measurement of blood pressure under various circumstances. Electronic devices have been used such as that illustrated in the patent to H. R. Lippitt, 2,354,818, in which a microphonic pick-up has been used with an electronic amplifier in connection with a sphygmomanometer cuff. Similarly, manometric chambers have been used, as for example, that illustrated in the patent to Strauss, 2,193,945. These methods, while suitable for the process for which they were originally designed, are not suitable for the measurement of blood pressure of laboratory animals.

As a more convenient method and more suitable for laboratory animals, we have perfected a method of measuring the blood pressure in which a sphygmomanometer cuff is used for blood pressure cut off but in which the blood flow to the portion of the animal is measured by a photoelectric system. In the past, photo-electric systems have been used to measure densities such as the system used in the smoke duct of Ryder, Patent 2,363,473, but such a system, while suitable for measuring an absolute value is not particularly suitable for measuring a slight change in relative value. Our apparatus is so arranged that the absolute value of light transmission is not measured, but on the contrary, the change in value, and by using a portion of an animal, for example the foot of a rat, and using a sphygmomanometer cuff, it is possible to get large needle deflections, that is, a needle deflection of an ample portion of the total scale range, on the photo cell system. A particular circuit which we find very suitable for the instant application is one in which the relative value only is determined and a few percent change in the light transmission represents a full scale deflection of the indicated meter, as will be more particularly seen from the detailed description below.

A conventional light meter may be used but such a device frequently would necessitate an inconvenient long scale and a disproportionately accurate galvanometer movement. Inasmuch as the difference between two transmission values is to be determined, more conveniently, a differential light meter circuit may be used in which the galvanometer, in this case a microammeter, as used to indicate changes in light values from a pre-set value, so that the change in light value rather than its absolute value is determined from the scale. When the machine is in operation and properly adjusted the variation in light caused by inserting a clean microscope slide between the light source and the photocell is sufficient to cause a meter needle deflection of a considerable portion of its scale.

Whereas our invention may be used for measuring force, length or other variables, it will be described specifically as applied to the measurement of the blood pressure of a rat.

The accompanying drawings show:

Figure 1, a view of our apparatus in operation determining the blood pressure of a rat. Figure 2, a wiring diagram of a specific photocell circuit which is suitable for use in conjunction with our invention. Figure 3, a cross up sketch of a rat's foot in position showing the sphygmomanometer cuff and illumination source. Figure 4, a specific embodiment of our invention as applied to our measurement of the blood pressure of a person's finger. Figure 5, a specific embodiment of our invention showing the use of a bellows as in conjunction with a thermometer or other fluid pressure sources. Figure 6, an embodiment of our invention shown in conjunction with a tambour. Figure 7, typical tube characteristic curves showing the crossed plate currents of the photocell circuit shown in Figure 2. Figure 8, a diagrammatic sketch showing the light source, the light being transmitted down a plastic rod, then through a rat's foot to a photoelectric cell.

In a specific embodiment of our method, as illustrated in the accompanying drawings, the rat is suspended in a restraining cage, which consists of a metal can 1 with an overlapping cover which allows air to freely circulate, but which is comparatively light tight. Around the lower part of this can is a body holder 2 preferably of leather, shaped in cylindrical form, but with a lower portion having apertures for the legs and the T-shaped portion between the legs being brought up like a diaper, to prevent the rat from escaping to the rear. The holder encloses the animal and it is fastened about the animal, with ordinary paper clamps 3. The leather is attached to the can by a clamp 4. The rat is so suspended that it is comfortable, is in a dark, warm and comfortable location and accordingly does not squirm nor attempt to escape. With the rat suspended in this position, the rear legs are accessible. A sphygmomanometer cuff 5 is then wrapped around one of the rat's legs as shown in Fig. 3. The cuff is preferably of very thin rubber. The size of the cuff is important in that on a diameter as small as a rat's leg the stiffness of the rubber may have marked effect upon the pressure exerted upon the leg.

Excellent cuffs may be made of thin rubber tubing which is approximately $\frac{3}{16}''$ outside diameter and 3'' long. The tube may be prepared by emulsifying natural latex and filtering the emulsion through cheese cloth and allowing to stand for approximately one hour so that any air bubbles therein may be brushed off the top of the solution. Glass rods of the desired diameter, approximately 10'' to 12'' long are well cleaned, rinsed with distilled water, rinsed with 3% ammonia water, allowed to air dry and dipped into the latex. The rods are carefully withdrawn at a constant rate of speed, preferably by mechanical means. The rate of withdrawal of the rod determines the uniformity and thickness of the rubber tube, four inches per minute giving a desirable film thickness. A single dip cuff gives a very thin rubber tube which does not stand prolonged use. A double dipped tube, from a rod which had been permitted to stand approximately two minutes after the first dip and then again immersed and withdrawn at the same speed and allowed to air dry, gives a more rugged cuff and is sufficiently flexible. The tube is allowed to air dry from 72 to 96 hours at room temperature, or four to six hours in an oven at approximately 100° C., then lubricated with glycerine and talc, and peeled carefully from the rod. The tube is then washed, dried and lubricated with talc. Closed end tubes may be made, although it is usually more convenient to cut a section of a longer tube and seal the end of the tube with rubber cement. The open end is sealed with rubber cement to a piece of stiffer rubber tubing. A 5'' section of $\frac{3}{16}''$ catheter tube is very satisfactory. A few turns of thin sheet rubber may be used to reinforce and strengthen the joint. Cuffs of varying outside diameters and wall thicknesses may be used but if the diameter of the cuff is less than $\frac{1}{8}''$, the wall thickness may be such that considerable pressure is required to overcome the resistance of the rubber tubing, which will give false readings. The diameter of the tube in the cuff should not be markedly greater than the rat's leg at the point of attachment.

The rat's foot is then placed in a holder 6 over a photoelectric cell 16. A holder is most conveniently constructed in the form of a cross countersunk in the top surface of a block so that the rat's foot is in the main body of the cross with at least one toe extending into each of the three branches of the cross so that the rat may brace his foot in the block and so that the foot is comparatively immovable without the necessity of its being tightly bound. A small clip 7 may be used to assist in positioning the rat's foot. The holder with the rat's foot therein is located over the photoelectric tube so that an aperture 20, Fig. 3, in the middle of the cross is directly above the tube and so that no stray light impinges on the tube. Figure 8 shows diagrammatically such an apparatus in use on a rat's foot. The illumination may be conveniently furnished by mounting a small electric bulb, preferably battery operated, in a holder 8, preferably with heat radiating fins thereon, and with a piece of clear "Lucite" (polymerized methylmethacrylate) 9 which serves as a tube to conduct light from the bulb down to the foot. The end of this tube should be cut and polished so that light is conducted to the vicinity of the foot, and shines down upon the top of the foot in such a direction that the main beam of light is directed through the foot and impinges upon the photoelectric tube. The area of illumination should more than cover the aperture. Other means may be used for illuminating the foot of the rat, but the use of such a light conducting rod enables a comparatively high level of illumination to be directed in restricted quarters without the heat of the lamp bulb affecting the rat. An ordinary blood pressure sphygmomanometer bulb 10 and escape valve is connected to the cuff and to a pressure gauge 11 so that instantaneous readings of cuff pressure are readily obtained. The intensity of illumination penetrating the rat's foot may be conveniently measured by a sensitive photoelectric cell hook up. For the present purposes, a RCA type 922 phototube 16 may be connected in series with a 1T4 tube 17, which serves as an adjustable load impedance. The screen grid of the load impedance tube 17 is tapped to the central point of a potentiometer 13 to give fine variation in the impedance of the tube. The plate of the tube is connected to the control grid of a 1S4 tube, diagrammatically shown at 18, which acts as an amplifier as shown in Figure 2. The screen grid and suppressor grid are conventionally connected, to the plate and cathode respectively. These grids, and the filament circuits are omitted from the drawing to avoid confusion. By using about a 22½ volt battery 19 across the photocell and its impedance, and 13 volts across the 1S4, as shown in the wiring diagram, a very sensitive and comparatively stable circuit is obtained. A microammeter 12 indicates the current through the amplifier, and thus a measure of the light incident on the phototube. Resistor-switches 14 and 15 can be used to control the light source, and the power supply to the amplifier.

Figure 7 shows the characteristics of the tubes connected in series, and shows how a slight change in light value, as represented by curves $L_1$ and $L_2$ will cause a marked change in the potential of the common junction, and in turn, the grid of the amplifying tube. This particular differential arrangement of the electron tubes permits a much more sensitive circuit for the required purposes than does the conventional type of photocell amplifier. This type of differential light meter is described at length in Electronics for June 1936, at page 36.

With this type of phototube amplifier, readings of absolute light intensities are not normally obtained, but relative light intensities are readily accurately measured. Slight fluctuations in illumination levels, battery potentials, and tube characteristics over a long period do not deleteriously affect the measurement, as it is desired to measure a relative rather than an absolute change in light transmissibility, in this specific embodiment of our invention.

The potentiometer control is connected to the screen grid of the 1T4 tube, as shown in Figure 2, so that by changing the adjustment of the potentiometer 13 it is possible to get full scale deflection of the microammeter with almost any light intensity, and thus use a large portion of the meter scale with any light level. A small change in light transmission may be caused to give a full scale deflection. Any conventional shunt or partial shunt may be used as desired to give fine control on the potentiometer.

In the use of the device the sphygmomanometer cuff is inflated above the expected blood pressure reading of the animal. The potentiometer is adjusted so that the microammeter reads in the upper quarter of its scale and the air pressure is gradually released by means of the bleed screw, as is customary in blood pressure measurements. The pressure should be slowly lowered in the cuff so that the pressure drops from approximately 240 mm. of mercury to 0 mm. in one-half minute. When the systolic pressure is reached, blood passes the cuff and into the rat's foot so that the foot swells and the increased density decreases the light transmited, and accordingly a characteristic drop in the microammeter reading will be obtained. This drop will stop if the cuff be immediately inflated past the systolic pressure, and start again when the cuff pressure is again lowered. When the venous pressure is reached, the blood in the foot will again circulate into the rat's body. The foot will shrink to its original volume since the blood can now leave the foot and the galvanometer needle will again rise to its former reading. The cuff pressure must not be dropped too fast or a false reading will be obtained as is the case with the standard mercury sphygmomanometer.

It is possible to take blood pressure readings by a variation of this method on the tail of the rat, but more satisfactory results are obtained on the foot. Blood pressures of larger animals as dogs, cats, etc. may be obtained by another variation by placing various members in the sphygmomanometer cuff. The machine is particularly adapted to take blood pressure readings difficult to get by conventional instruments as for example, small children or nervous individuals, by using a single finger for the test, as shown in Figure 4. By this means the patient is subjected to less discomfort, and accordingly the nervous reaction has less effect upon the blood pressure.

Other photoelectric circuits, other phototubes and other light sources may readily be used without departing from the spirit of our invention. It is desirable that the intensity of the light be variable as by a resistor switch control 14 inserted in the illuminating circuit.

Other forms of animal holders and sphygmomanometer cuffs may be devised to fit various laboratory animals.

The use of photoelectric cells to measure the transmission of light through a system has been previously known as in photoelectric colorimeters, spectrophotometers, etc. However, these former measurements have all been direct measurements in which the light was a function of the primary variable.

In our device, broadly the transmission of light through an animal's foot or through an absorbing medium contained in a corrugated bellows or other variable chamber, as illustrated in Figures 5 and 6, is used to determine the quantity of the absorbing material in an expansible chamber and the concentration or thickness of the layer in the expansible chamber is a derivative function of the primary variable, and accordingly variables may be more conveniently measured electronically than has been possible prior to our invention. Our invention is particularly convenient for remote indication and control devices.

A particularly convenient application of this principle may be used in remote reading thermometers in which the temperature bulb is connected by a tube 21 as shown in Figure 5, using a radiant energy absorbing indicating fluid, and in which a corrugated bellows for example, is mounted between the light source and the phototube so that variations in temperature will vary the opacity of the latter in the corrugated bellows, and accordingly the indicator needle. If it is desirable that the correlation be absolute rather than relative, it is of course necessary to use a stable photoelectric circuit, and calibrate the instrument.

For measurements in general, a tambour may be connected to a corrugated bellows with transparent ends and the system filled with a semiopaque fluid, as shown in Figure 6. A force, or distance movement, at the tambour diaphragm 22 causes a variation in the length of the light path through the bellows, which varies the opacity, and correspondingly the light transmitted, and hence the meter reading from the photocell. This system can be used, broadly, to give a remote indication of a variable of nearly any nature. Because of the extreme sensitivity of the set up, it is possible to get accurate remote indications more readily than by conventional means.

Filters may be used in the light path to permit only light of a particular color to pass, and indeed the light need not even be in the visible range. Normally, such filters are not needed. A photocell must be chosen that is sensitive to the light used. For blood pressure work, caesium cells are particularly useful. Any source of radiant energy may be used, with a receiver adaptable to measure such energy, and the variable causes a change in the absorbing ability of the system.

Force, acceleration, weight, mass, pressure, length, etc. may move the diaphragm of the tambour, 22, and accordingly be measured.

Having described and pointed out the advantages and features of our invention we claim as our invention:

1. A photoelectric blood pressure measurement device comprising a manometric cuff, a pressure gage connected to said cuff, an inflation system for adjustably varying the pressure in said cuff, a holder for a portion of a test subject the circulation to which is affected by said cuff, a light source, and a light measurement means whereby the influence of the manometric cuff on the transmission of light through a portion of the test subject may be measured.

2. A photoelectric blood pressure measurement device comprising a sphygmomanometer cuff, a pressure gage connected to said cuff, an inflation system for adjustably varying the pressure in said cuff, a light source, and a light measurement means comprising a photocell connected, plate to plate in series with an amplifying tube, means for varying the control grid voltage of said tube, a second tube, the control grid of which is connected to the common plate connection of said photocell and said tube, and a current measuring device in the plate circuit of said second tube, whereby the light transmission may be measured to indicate the effect of the said cuff on blood circulation.

3. In a method of measuring the blood pressure of a living animal the steps which comprise altering the circulation in a selected portion of the animal by the operation of an indicated fluid pressure, transmitting light from a substantially constant intensity source through at least a part of said portion, causing at least a portion of said transmitted light to effect a photoelectric cell system, and measuring the current through said photo-cell system, thereby obtaining an indication of the blood pressure of the animal.

4. A photoelectric blood pressure device comprising a manometric cuff, a pressure gage connected to said cuff, an inflation system for adjustably varying the pressure of said cuff, a light source of substantially constant intensity, and a light measurement means comprising a photocell system, whereby the influence of said manometric cuff upon the flow of blood through a portion of a test subject is indicated.

WILLIAM G. BROSENE, Jr.
HAROLD J. KERSTEN.

REFERENCES CITED

The following references are of record in the file of this patent:

UNITED STATES PATENTS

| Number | Name | Date |
|---|---|---|
| 1,667,409 | Barr | Apr. 24, 1928 |
| 1,866,531 | Simjian | July 12, 1932 |
| 2,088,198 | Geffcken | July 27, 1937 |
| 2,299,109 | Rand | Oct. 20, 1942 |
| 2,414,747 | Kirschbaum | Jan. 21, 1947 |
| 2,493,301 | Loria et al. | Jan. 3, 1950 |

OTHER REFERENCES

Publication by F. H. Shepard, Jr., entitled "Application of Conventional Vacuum Tubes in Unconventional Circuit," a publication of R. C. A. Mfg. Co., Inc., pages 1575 to 1578. (Copy in Div. 54.)